United States Patent [19]
Anderson et al.

[11] 3,780,306
[45] Dec. 18, 1973

[54] RADIOACTIVE SHIPPING CONTAINER WITH NEUTRON AND GAMMA ABSORBERS

[75] Inventors: Clifford J. Anderson, Buckeystown, Md.; Reuben W. Peterson, Wilmington, Del.

[73] Assignee: National Lead Company, New York, N.Y.

[22] Filed: May 27, 1971

[21] Appl. No.: 147,519

[52] U.S. Cl. ............................ 250/428, 250/507
[51] Int. Cl. .......................................... G21f 1/00
[58] Field of Search .................. 250/89, 84.5, 108, 250/108 R

[56] References Cited
UNITED STATES PATENTS

| | | | |
|---|---|---|---|
| 2,961,415 | 11/1960 | Axelrad | 250/108 R |
| 3,414,727 | 12/1968 | Bonilla | 250/108 R |
| 3,111,586 | 11/1963 | Rogers | 250/108 R |
| 2,928,948 | 3/1960 | Silversher | 250/108 R |
| 3,466,662 | 9/1969 | Blum | 250/108 R |
| 3,432,666 | 3/1969 | Nash et al. | 250/108 R |
| 3,005,105 | 10/1961 | Lusk | 250/108 R |
| 2,495,781 | 1/1950 | Silverman | 250/108 R |
| 3,179,243 | 4/1965 | Ashcroft | 250/108 R |

*Primary Examiner*—James W. Lawrence
*Assistant Examiner*—Harold A. Dixon
*Attorney*—Robert L. Lehman, Fred Floersheimer and Jay D. Gordon

[57] ABSTRACT

The shipping container includes inner and outer shell means having gamma radiation shielding means disposed between the shell means. Neutron radiation shielding means is disposed outwardly of the gamma radiation shielding means. Heat conducting means is disposed in engagement with the outer shell means and is interspaced with the neutron radiation shielding means to conduct heat therethrough.

15 Claims, 10 Drawing Figures

INVENTORS
CLIFFORD ANDERSON &
REUBEN W. PETERSON

BY

ATTORNEY

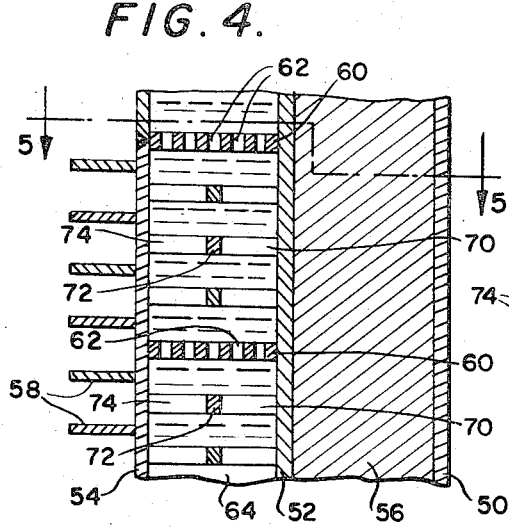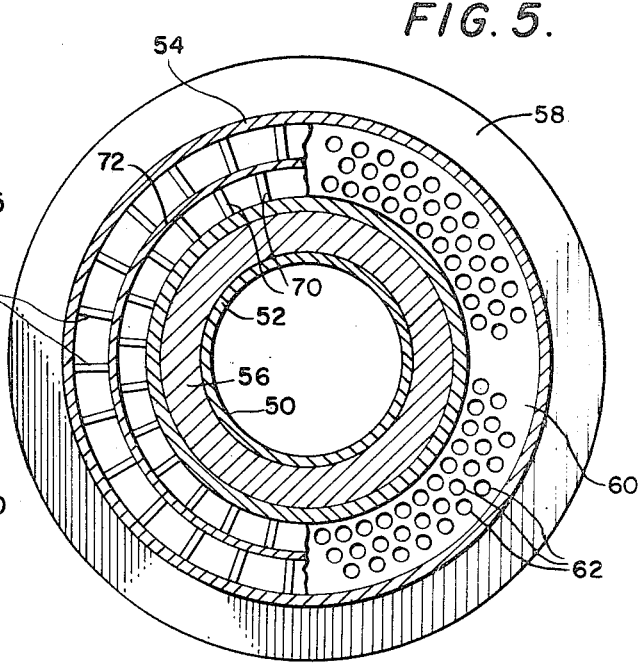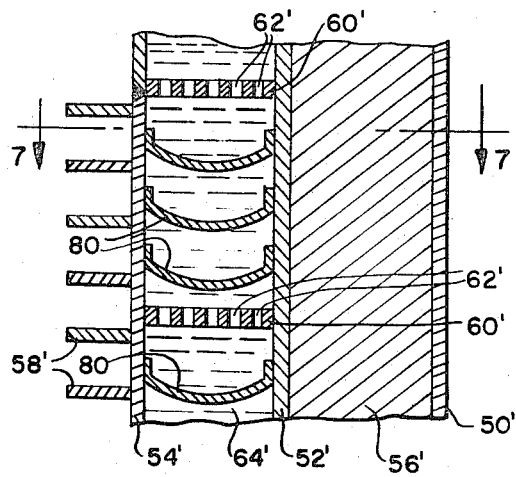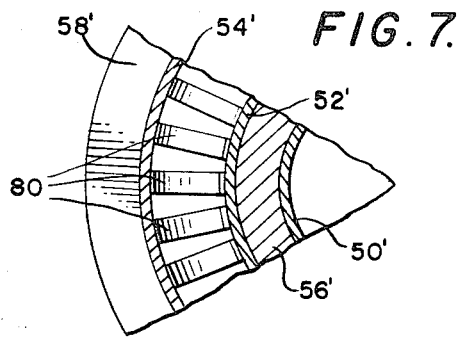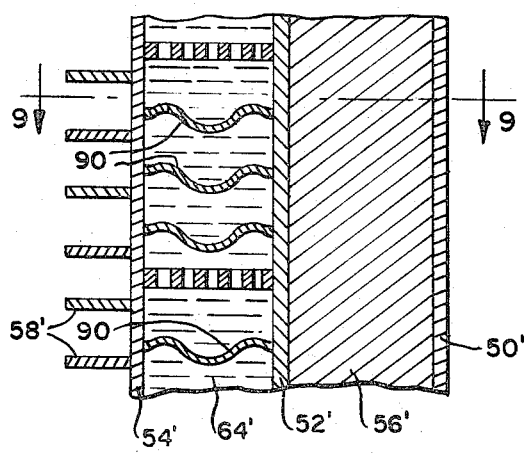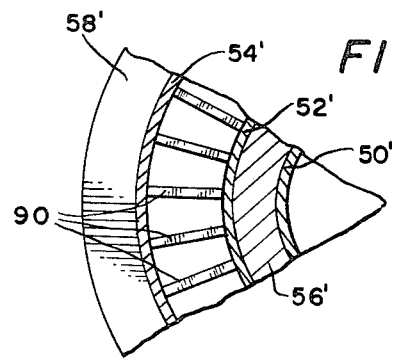

RADIOACTIVE SHIPPING CONTAINER WITH NEUTRON AND GAMMA ABSORBERS

BACKGROUND OF THE INVENTION

The present invention relates to a new and novel shipping container for radioactive material, and more particularly to a shipping container which is especially adapted to ship spent fuel elements utilized in nuclear reactors and the like. The present invention may be employed for shipping various types of radioactive material and is particularly suited for shipping irradiated nuclear fuel elements, the container normally being mounted on railroad cars, trailers and the like for transport from one place to another. Such shipping containers must provide adequate radiation protection for personnel in the area of the container, and in addition the container must provide adequate physical protection for the radioactive material during shipment as well as during possible accidental conditions.

During the last few years, a new problem has arisen in regard to providing adequate shielding of spent fuel. In the past, the shielding problem has been confined to gamma radiation only. However, it is now known that light-water spent fuel emits neutron radiation, and normal gamma radiation shielding material such as lead, steel, tungsten and uranium and the like are poor shielding materials for neutron radiation.

It is necessary to provide a composite shielding means combining heavy metals to serve as a shielding means for the gamma radiation and further incorporating hydrogenous materials to serve as shielding means for the neutron radiation. Early obvious solutions to this problem were to provide enough ordinary water surrounding the fuel assemblies and disposed within a body means incorporating the usual gamma radiation shielding material. This type of construction provides adequate results, but the weight of the shipping container is markedly increased with such an arrangement.

Another problem encountered with composite gamma and neutron shielding materials is the heat removal problem since ideal neutron shielding materials are very poor heat conductors. One prior art solution has been to transfer the heat through pipes and heat exchangers directly from the cavity disposed within the shipping container to external heat exchangers. This raises serious problems with respect to safety and reliability. Under accident conditions it is virtually impossible to consider such systems effective.

It is accordingly a principal objective of the present invention to provide a shipping container incorporating suitable shielding means whereby the gamma and neutron raidation emitted by light-water reactor spent fuel is attenuated to acceptable levels while achieving minimum weight of the shipping container and adequate decay heat transfer through the composite shielding under both normal and accident conditions.

SUMMARY OF THE INVENTION

The shipping container of the present invention includes body means having inner and outer shell means with gamma radiation shielding means in the form of a heavy metal disposed betweeen the shell means. Neutron radiation shielding means is disposed outwardly of the gamma radiation shielding means and is formed of an hydrogenous material. Heat conducting means is in contact with the outer shell means of the container and is interspaced with the neutron radiation shielding means to insure effective heat transfer through the hydrogenous material, without radiation streaming at the interfaces between the heat conducting means and the hydrogenous material.

The hydrogenous material may comprise a solid elastomeric material and the heat conducting means in such a case comprises a plurality of thin fins extending through the hydrogenous material. The hydrogenous material may also comprise a liquid having a plurality of heat conductors extending therethrough. The heat conducting means in each case is so arranged as to prevent neutron streaming therethrough.

BRIEF DESCRIPTION OF THE DRAWINGS

FIG. 4 is a sectional view illustrating still another form of the invention;

FIG. 5 is a sectional view taken substantially along line 5—5 of FIG. 4 looking in the direction of the arrows;

FIG. 6 is a sectional view of another form of the invention;

FIG. 7 is a sectional view taken substantially along the line 7—7 of FIG. 6 looking in the direction of the arrows;

FIG. 8 is a section through yet another form of the invention;

FIG. 9 is a sectional view taken substantially along line 9—9 of FIG. 8 looking in the direction of the arrows.

DESCRIPTION OF THE PREFERRED EMBODIMENTS

Figure 1:
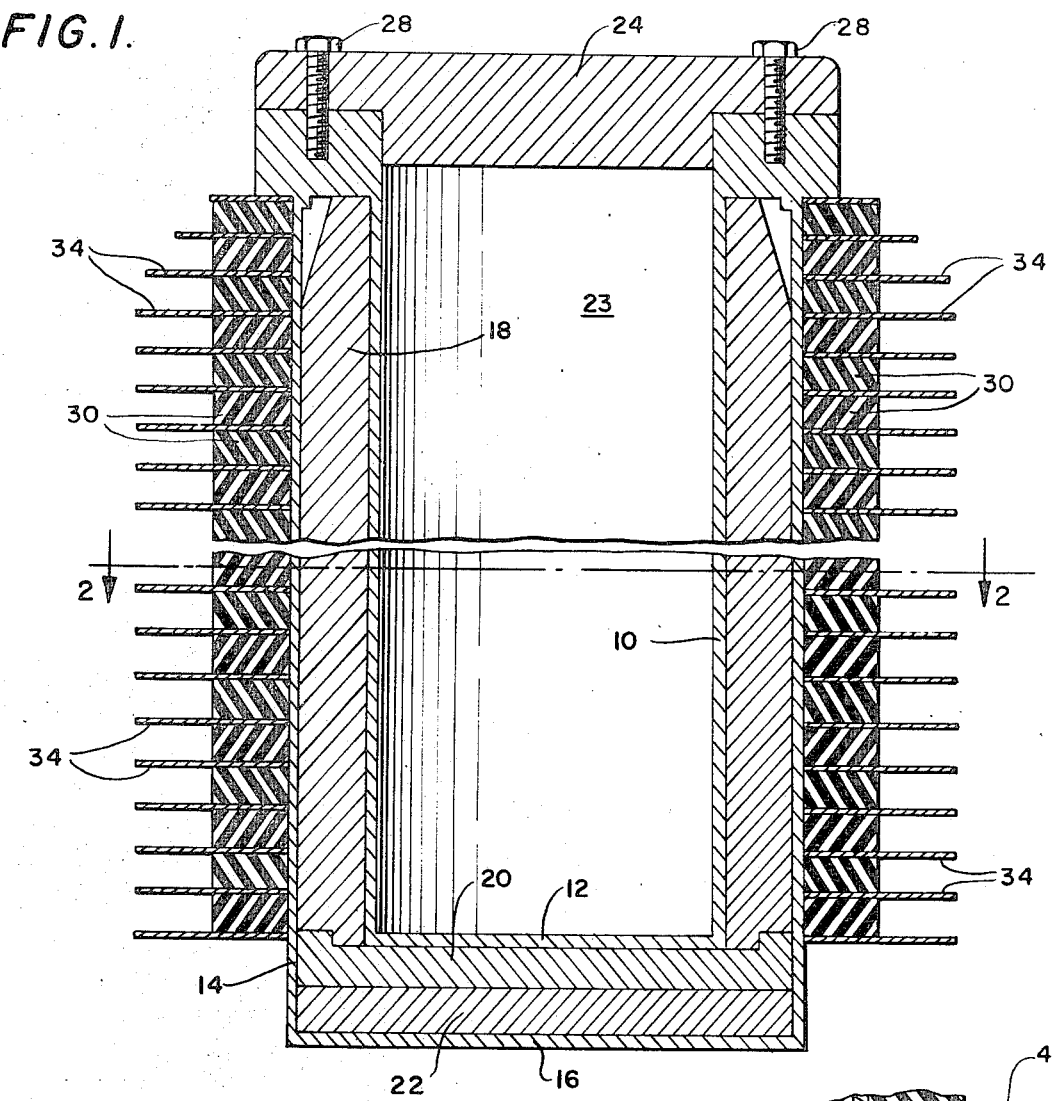
FIG. 1 is a longitudinal section partly broken away through a shipping container according to the present invention.
Figure 2:
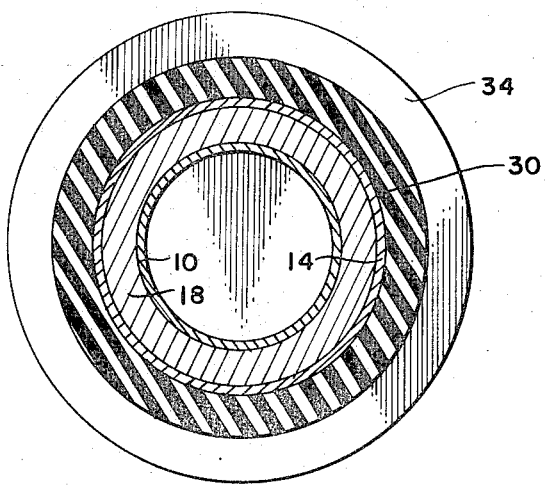
FIG. 2 is a sectional view on a reduced scale taken substantially along line 2—2 of FIG. 1 looking in the direction of the arrows.

Referring now to the drawings, wherein like reference characters designate corresponding parts throughout the several views, a first form of the invention is illustrated in FIGS. 1 and 2. The shipping container includes body means comprising an inner shell means 10 with a bottom 12 and an outer shell means 14 with a bottom 16, the outer shell means being disposed in spaced relationship to the inner shell means. These shell means are formed of a suitable material such as stainless steel and the like.

Gamma radiation shielding means is disposed between the inner and outer shell means and includes a plurality of uranium castings 18 or lead at the side of the body means and an uranium casting 20 at the bottom of the body means. A body of lead 22 may be disposed between casting 20 and bottom 16 of the outer shell means if additional impact resistance is desired.

A central radioactive material receiving cavity 23 is defined within the shipping container and is closed off by an end closure or head 24 which may have an uranium insert therein if so desired. End closure 24 is held in the operative position illustrated by a plurality of cap screws 28 extending through holes provided in the end closure and being threaded into suitable threaded holes provided in the body means.

The neutron radiation shielding means in this form of the invention comprises a hydrogenous material 30 disposed outwardly of and in surrounding relationship to the gamma radiation shielding means 18. The hydrogenous material employed in the present invention is UNIROYAL 3807, manufactured by Uniroyal Plastic Products Division of Uniroyal, Inc., Mishawaka, Indiana. This neutron radiation shielding substance is an elastomeric based compound with excellent neutron attenuation characteristics. The softening point of the material is in excess of 320° F since it is a vulcanizable co-polymer and is accordingly essentially a thermosetting material. This material offers light weight flexibility, stability at higher operating temperatures, fire resistance and impact protection while providing the required neutron attenuation.

Heat conducting means is provided in the form of a plurality of thin spaced annular fins 34 formed of a material of high thermal conductivity. These fins are preferably formed of copper and are fixedly secured to the outer surface of outer shell means 14 which comprises 20 percent copper clad steel. These heat conducting fins extend through and are interspaced with the neutron radiation shielding means and serve to effectively transfer heat through the neutron radiation shielding means. The fins have a maximum thickness of about one-eighth of an inch and are spaced approximately one and three-quarter inches apart. The fact that the fins are thin as well as the spacing thereof effectively insures that there will not be excessive neutron streaming through the heat conducting fins. The hydrogenous material accordingly provides adequate shielding against neutron radiation.

The combination of the uranium or lead gamma radiation shielding means and the elastomeric neutron radiation shielding means provides an optimized composite gamma-neutron shield. The composite shield also provides additional advantages under accident conditions. The neutron radiation shielding means has a radial thickness of approximately 6 inches and provides additional resistance to the side impact and puncture. It additionally provides resistance to fire since it is a material that is fire resistant. The basic material is flammable but is coated on the outer surface with a fire resistant composition similar to the basic material.

Figure 3:
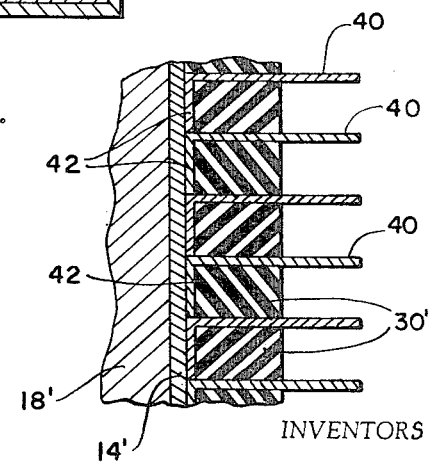
FIG. 3 is a sectional view illustrating a modified form of the invention.

Referring now to FIG. 3 of the drawings, a modification of the invention is illustrated wherein similar parts have been given the same reference numerals primed. The only difference in this form of the invention is the fact that the heat conducting fins 40 which replace the heat conducting fins 34 as seen in FIG. 1 are provided with annular flanges 42 extending substantially perpendicular to the main bodies of the fins, these flanges 42 serving as integral spacer portions and providing an extended surface for thermal bonding with the outer shell for adequate heat transfer. The inner peripheries of the spacer portions in this form of the invention are silver soldered, brazed or otherwise bonded to the stainless steel outer shell means, and in this embodiment it is not necessary to copper clad the outer shell means while the spacer portions have been shown as being integral, they may also be formed as separate pieces suitably connected to the outer shell and the fins.

Referring now to FIGS. 4 and 5 of the drawings, a further modified form of the invention is illustrated. The shipping container in this embodiment includes an inner shell means 50, an intermediate shell means 52 and an outer shell means 54. Gamma radiation shielding means 56 is provided between the inner shell means and the intermediate shell means and may, for example, comprise uranium castings and the like. A plurality of spaced annular heat conducting fins 58 are secured to the outer surface of the outer shell means 54 and extend radially outwardly thereof.

A plurality of spaced annular support plates 60 are connected between the intermediate shell means and the outer shell means to support the outer shell means in operative position. Each of these support plates is of foraminous construction and is provided with a plurality of holes 62 formed therethrough. As seen in FIG. 5, these holes are disposed in staggered relationship with respect to one another so that there is no direct radially outward path defined by the solid portions of the support plates thereby preventing excessive neutron streaming through the support plates.

The neutron radiation shielding means in this form of the invention comprises a body of liquid 64 disposed between the intermediate shell means and the outer shell means. The hydrogenous liquid may comprise water, oils, paraffin and the like.

The heat conducting means in this form of the invention comprises a plurality of bar heat conductors formed of a material such as copper having high thermal conductivity. A first plurality of spaced bars 70 is connected between the intermediate shell means and an annular ring 72. A second plurality of bar conductors 74 is connected between ring 72 and the outer shell means 54. As seen in FIG. 5, the inner bar heat conductors 70 are staggered or offset with respect to the outer bar heat conductors 74 thereby preventing neutron streaming through the metallic bar conductors extending through the hydrogenous liquid. These conductors are bonded to the shells so as to have intimate mechanical contact for efficient heat transfer from the shell means to the conductors.

The heat conducting means increases the heat dissipation capacity of the shipping container under normal conditions, and under accident conditions wherein the hydrogenous liquid could conceivably be lost, these conductors serve to conduct all the heat from the intermediate shell means across the resulting void space to the outer shell means thereby limiting internal temperatures to acceptable safe levels.

The liquid filled space between the intermediate shell means and the outer shell means provides excellent energy absorption under side impact conditions. In the event of an accidental fire, the heat capacity of the hydrogenous liquid, particularly water, reduces internal temperatures thereby increasing the safety of the container.

Referring now to FIGS. 6 and 7 of the drawings, a further form of the invention is illustrated wherein parts similar to those shown in FIGS. 4 and 5 have been given the same reference numeral primed. The only difference in this form of the invention is the fact that the bar heat conductors have been replaced by strip heat conductors 80 formed of a suitable material such as copper, these strip conductors being of generally arcuate configuration to prevent neutron streaming. These conductors are also connected between the intermediate shell means and the outer shell means and are disposed in spaced relationship with respect to one another.

Referring now to FIGS. 8 and 9, still another form of the invention is illustrated wherein parts similar to those described in connection with FIGS. 4 and 5 have been given the same reference numeral primed.

In this form of the invention, the heat conducting means comprises a plurality of rod heat conductors 90 formed of copper or the like and connected between the intermediate shell means and the outer shell means. These rod heat conductors are of curved or sinuous configuration to prevent neutron streaming through these metallic heat conducting members.

Figure 10:
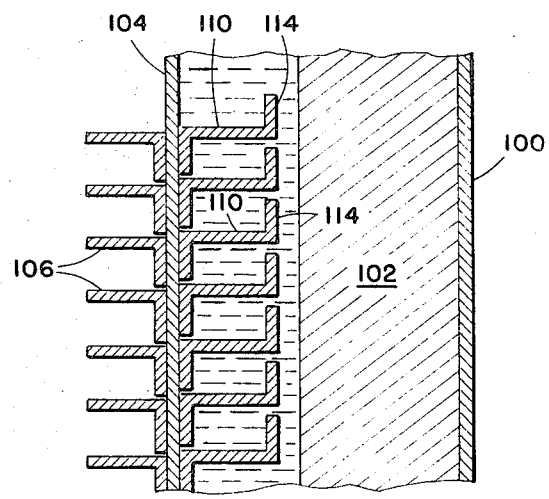
FIG. 10 is a section through still another form of the invention.

Referring now to FIG. 10 of the drawings, still another form of the invention is illustrated. The shipping container in this embodiment includes an inner shell means 100 surrounded by gamma radiation shielding means 102. An outer shell means 104 is spaced outwardly of the gamma radiation shielding means and has a plurality of cooling fins 106 suitably secured thereto.

The heat conducting means in this form of the invention includes a plurality of heat conductors 110 having outer flanges 112 suitably connected to the inner surface of the outer shell means. Heat conductors 110 also include inner flanges 114 defining a series of spacers which effectively form an intermediate shell means.

This intermediate shell means serves as a heat collector surface common to the heat conducting means since it is not desirable to attach the heat conducting means directly to the gamma radiation shielding means. The intermediate shell means does not have to be liquid tight, and a body of liquid hydrogenous material is disposed between an intermediate shell means and the outer shell means and further is disposed in contact with gamma radiation shielding means thereby increasing heat transfer from the gamma radiation shielding means to the intermediate shell means.

As this invention may be embodied in several forms without departing from the spirit or essential characteristics thereof, the present embodiment is therefore illustrative and not restrictive, and since the scope of the invention is defined by the appended claims, all changes that fall within the metes and bounds of the claims or that form their functional as well as conjointly cooperative equivalents are therefore intended to be embraced by those claims.

What is claimed is:

1. A shipping container for radioactive material comprising body means including inner shell means and outer shell means disposed in spaced relationship to said inner shell means, gamma radiation shielding means formed of dense material and disposed between said inner and outer shell means, neutron radiation shielding means disposed outwardly of said gamma radiation shielding means and being formed of hydrogenous material, and heat conducting means formed of a material of high thermal conductivity and arranged in contact with said outer shell means, said heat conducting means being interspaced with said neutron radiation shielding means, said heat conducting means and said neutron radiation shielding means being characterized by a construction and arrangement designed to provide an indirect neutron path from said inner shell means to said outer shell means for preventing excessive neutron streaming, the heat conducting means and neutron radiation shielding means including portions disposed in an annular area co-extensive with said outer shell means.

2. A shipping container as defined in claim 1 wherein said hydrogenous material is a solid elastomeric substance.

3. A shipping container as defined in claim 1 wherein said neutron radiation shielding means is disposed outwardly of said outer shell means.

4. A shipping container as defined in claim 1 wherein said heat conducting means are constructed and arranged as a plurality of relatively thin fins disposed in closely spaced relationship to one another to provide said indirect neutron path, said fins being fixed to and extending outwardly from said outer shell means.

5. A shipping container as defined in claim 4 wherein said fins include integral spacer portions for providing thermal bonding or contact with the outer shell means for adequate heat transfer from the outer shell means to said fins.

6. A shipping container as defined in claim 1 including intermediate shell means disposed between said inner and outer shell means and spaced therefrom, heat conducting means between said intermediate and outer shell means and in contact therewith said hydrogenous material comprising a liquid and being disposed between said intermediate shell means and said outer shell means.

7. A shipping container as defined in claim 6 wherein said liquid is in contact with said gamma radiation shielding means.

8. A shipping container as defined in claim 6 including foraminous support means connected between said intermediate shell means and said outer shell means.

9. A shipping container as defined in claim 6 wherein said heat conducting means includes a plurality of elongated heat conductors connected between said intermediate shell means and said outer shell means, said heat conductors each including portions disposed at an angle to one another in the longitudinal direction to prevent neutron streaming therethrough.

10. A shipping container as defined in claim 6 wherein said intermediate shell means is defined by a portion of a plurality of heat conductors connected to the inner surface of the outer shell means, said liquid also being in contact with said gamma radiation shielding means.

11. A shipping container as defined in claim 6 wherein said heat conducting means comprises a plurality of bar heat conductors constructed and arranged in staggered relationship to each other to prevent neutron streaming, said bar heat conductors connected between said intermediate shell means and said outer shell means.

12. A shipping container as defined in claim 6 wherein said heat conducting means are constructed and arranged as a plurality of strip heat conductors of generally arcuate configuration to prevent neutron streaming said strip heat conductors connected between said intermediate shell means and said outer shell means.

13. A shipping container as defined in claim 6 wherein said heat conducting means are constructed and arranged as a plurality of rod heat conductors of curved configuration to prevent neutron radiation said rod heat conductors connected between said intermediate shell means and said outer shell means.

14. A shipping container for radioactive material, comprising an elongate body including an outer shell having side wall regions defining the major outer surface area of said body, an inner shell nested within said outer shell and defining a cavity for radioactive material within said body, each said inner shell and said outer shell being formed of material having a high coefficient of thermal conductivity and each having side wall means defining a space circumscribing said inner shell; heat transfer means for transferring heat by conduction uninterruptedly from said side wall means of said inner shell to said side wall means of said outer shell, said heat transfer means including, in combination, a collar of gamma radiation shielding material surrounding said side wall means of said inner shell and located within said space, and a series of spaced heat-conducting fins circumscribing the side wall means and projecting outwardly therefrom, and neutron radiation shielding means surrounding said gamma radiation shielding material said neutron radiation shielding means comprising a series of collars embracing said side wall means of the outer shell and filling the spaces between said fins.

15. A shipping container for radioactive material, comprising an elongate body including an outer shell having side wall regions defining the major outer surface area of said body, an inner shell nested within said outer shell and defining a cavity for radioactive material within said body, each said inner shell and said outer shell being formed of material having a high coefficient of thermal conductivity and each having side wall means defining a space circumscribing said inner shell; heat transfer means for transferring heat by conduction uninterruptedly from said side wall means of said inner shell to said side wall means of said outer shell, said heat transfer means including, in combination, a collar of gamma radiation shielding material surrounding said side wall means of said inner shell and located within said space; and a series of spaced members projecting inwardly from the inner surface of said side wall means of said outer shell, said spaced members comprising annular plates provided with laterally directed heat-conducting flanges along their inner edges arranged collectively to form an intermediate shell between said inner and outer shell means, and neutron radiation shielding means surrounding said gamma radiation shielding material, said neutron radiation shielding means comprising a liquid contained within said outer shell.

* * * * *